(12) United States Patent
Mori

(10) Patent No.: US 6,357,244 B1
(45) Date of Patent: Mar. 19, 2002

(54) AIR CONDITIONING CONTROL SYSTEM FOR VEHICLES FOR COMMON USE

(75) Inventor: Naoki Mori, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,489

(22) Filed: Mar. 13, 2000

(30) Foreign Application Priority Data

Mar. 12, 1999 (JP) ............................................. 11-067589

(51) Int. Cl.⁷ ................................................. F25F 19/00

(52) U.S. Cl. .............................. 62/231; 62/244; 236/51; 165/43; 165/202; 165/266

(58) Field of Search ..................... 62/231, 244; 236/51; 165/266, 202, 43; 237/12.3 C

(56) References Cited

U.S. PATENT DOCUMENTS 4,280,330 A * 7/1981 Harris et al. ............ 237/12.3 C
5,066,853 A * 11/1991 Brisson ....................... 235/381
5,499,512 A * 3/1996 Jurewicz et al. ............... 236/51

* cited by examiner

Primary Examiner—William E. Tapolcai
Assistant Examiner—Mohammad M. Ali
(74) Attorney, Agent, or Firm—Carrier, Blackman & Associates, P.C.; Joseph P. Carrier; William D. Blackman

(57) ABSTRACT

An air conditioning control system for vehicles for common use, includes: a reservation unit for reserving a rentals of the vehicles for common use with corresponding delivery times therefor; and an activating unit for activating an air conditioner of each of the vehicles so reserved when the corresponding delivery time therefor approaches so that a comfortable condition is produced in the passenger compartment of the vehicle when it is rented out a user who has reserved it.

13 Claims, 3 Drawing Sheets

AIR CONDITIONING CONTROL SYSTEM FOR VEHICLES FOR COMMON USE

BACKGROUND OF THE INVENTION

1. Field of the Invention

The present invention relates to an air conditioning control system for vehicles for common use.

2. Description of the Related Art

Conventionally known is a remote starter system for an air conditioner using a remote-controlled engine starter for a man-operated vehicle. This remote starter system comprises a remote-controlled terminal, a radio device mounted on an electric vehicle and an ignition control device mounted on the electric vehicle. When an ignition starting command is executed by the remote terminal, the command is received at the electric vehicle by the radio to thereby turn on the ignition and start an engine, whereby the air conditioner of the electric vehicle is started for operation.

In the conventional remote starter system, however, an exclusive or dedicated remote-controlled terminal is needed for each vehicle. Therefore, in a case where a number of self-operation vehicles need to be controlled collectively, there is caused a problem that a corresponding number of such dedicated terminals have to be used, which is very inefficient.

In addition, in recent years when much attention is drawn to environmental issues, a technique is proposed in which with a view to attaining an improvement in solving problems with air pollution and traffic jams, vehicles are commonly used in a specific area. However, as in this case, when the remote starter systems are applied to a number of self-operation vehicles, the remote-controlled terminals need to be mounted on the respective vehicles, and this results in a tremendous waste.

On the other hand, when trying to activate air conditioners of a number of self-operation vehicles in a simple collectively controlled fashion, there is caused a problem that the residual capacity of batteries of all of the waiting self-operation vehicles is undesirably reduced.

SUMMARY OF THE INVENTION

To this end, an object of the present invention is to provide an air conditioning control system for vehicles for common use which can eliminate the aforesaid waste even in a case where a number of self-operation vehicles are controlled in a collective fashion, and can provide an optimum in-compartment environment to users immediately after they rent out such vehicles.

With a view to solving the aforesaid problem, according to a first aspect of the invention, there is provided an air conditioning control system for vehicles for common use including reservation means (for example, a reservation terminal 9, as described in an embodiment hereinbelow) for reserving vehicles for common use for delivery for rent, as well as for specifying corresponding delivery times for rent (for example, a delivery time $T_2$ for rent as described in the embodiment below), and means for starting for operation air conditioners (for example, an air conditioner 5 as described in the same embodiment) of the vehicles for common use so reserved (for example, a vehicle 4 as described in the embodiment) when the corresponding delivery times for rent, which are inputted through the reservation means, approach.

With such construction, since the air conditioners of the reserved vehicles are started for operation when the specified delivery times for rent approach, an air conditioned state can be provided inside the compartments of the vehicles allocated to users at the specified delivery times for rent.

According to a second aspect of the invention, there is provided an air conditioning control system wherein the plurality of vehicles for common use are electric vehicles, and wherein air conditioners of only those of the electric vehicles are started for operation in accordance with the residual capacity of batteries thereof specifically, only those of the electric that are waiting for delivery for rent and which are equipped with batteries having the residual capacity equal to or greater than a predetermined amount (for example, 80% or greater, as described in the embodiment below).

With such construction, in a case where a vehicle is reserved which has a battery the residual capacity of which is low, the air conditioner of the vehicle is not activated, whereby a case is prevented from taking place in which the residual capacity of the battery is reduced further from the current low residual capacity.

According to a third aspect of the invention, there is provided an air conditioning control system wherein the air conditioners of reserved vehicles are started for operation predetermined lengths of time (for example, an hour as described in the embodiment below) prior to the delivery times for rent specified through the reservation means.

With such construction, the environment inside the compartments of the reserved vehicles can be set as desired by starting for operation the air conditioners thereof predetermined lengths of time prior to the specified delivery times for rent.

According to a fourth aspect of the invention, there is provided an air conditioning control system wherein the means for starting for operation the air conditioners of the reserved vehicles for common use comprises a supervision radio device (for example, a supervision radio device 2, as described in the embodiment below) on a supervision side (for example, a vehicle supervision 1, as described in the embodiment below) for transmitting to the reserved vehicles a command for self-operation, and a self-operation controlling radio device (for example, self-operation controlling radio devices 6 mounted on the vehicles respectively, as described in the embodiment below) on a vehicle side for receiving the command from the supervision radio device on the supervision side.

With such construction, a plurality of reserved vehicles can be dealt with, and the air conditioners of only those reserved vehicles can be started for operation in a collective fashion.

DETAILED DESCRIPTION OF THE PREFERRED EMBODIMENTS

Referring to the accompanying drawings, present embodiments of the invention will be described below.

Figure 1:
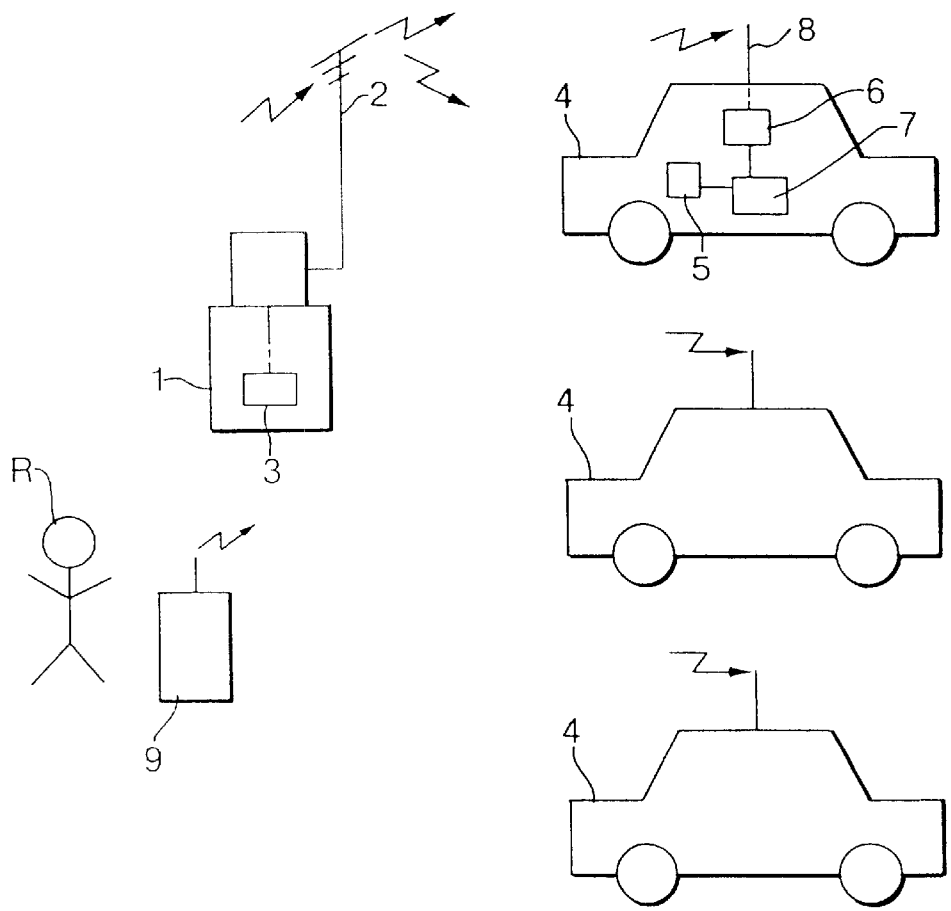
FIG. 1 is an overall explanatory view of an embodiment of the present invention.

In FIG. 1, reference numeral 1 denotes a vehicle supervision, and a supervision radio device 2 is provided on the vehicle supervision 1. The supervision radio device 2 is connected to a supervision controlling device 3 for self-operation electric vehicles such as a vehicle 4 for common use, which will be described later. Provided on the respective vehicles 4 are an air conditioner 5, a self-operation controlling radio device 6 and a vehicle controlling device 7 for connecting the air conditioner 5 to the self-operation controlling radio device 6. In the figure, reference numeral 8 denotes an antenna connected to the self-operation controlling radio device 6.

Reference numeral 9 denotes a reservation terminal, and this terminal 9 is provided at various places within the operating area of the vehicles 4 for operation by users of the vehicles 4 so as to send reservation information to the supervision controlling device 3.

Figure 2:
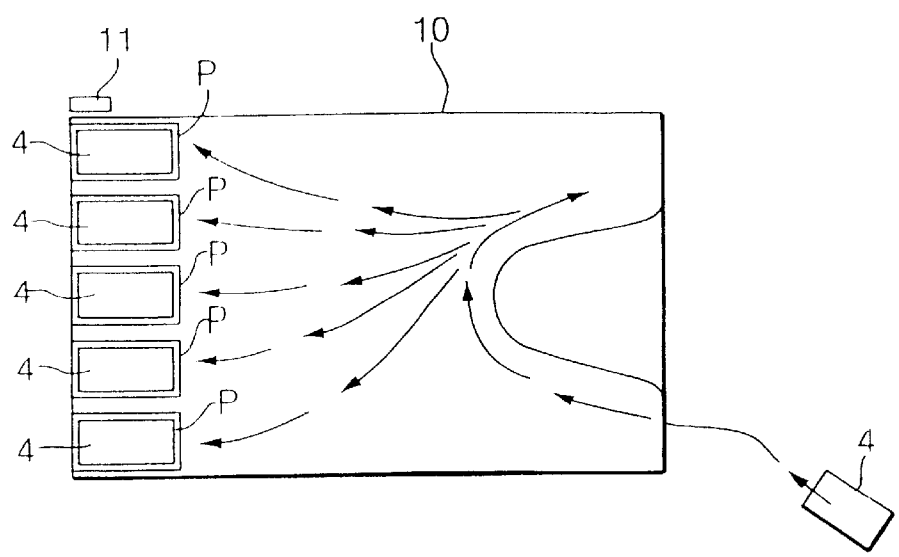
FIG. 2 is an explanatory view of a port for vehicles according to the embodiment.

Shown in FIG. 2 is a port 10 for waiting vehicles 4. This port 10 is provided with parking spaces P for stocking vehicles 4 returned and parking vehicles 4 prepared for delivery for rent and kept waiting until reservations are inputted therefore from the vehicle supervision 1 so that the vehicles can be delivered at specified delivery times without any delay when reservations are received from users R. Then, when there is located a vehicle needing re-charging based on data regarding the residual capacity of batteries of the stocked or parked vehicles 4 sent to the vehicle supervision 1 from the respective vehicles 4, the vehicle 4 is re-charged at the parking space P equipped with a battery charger 11.

Figure 3:
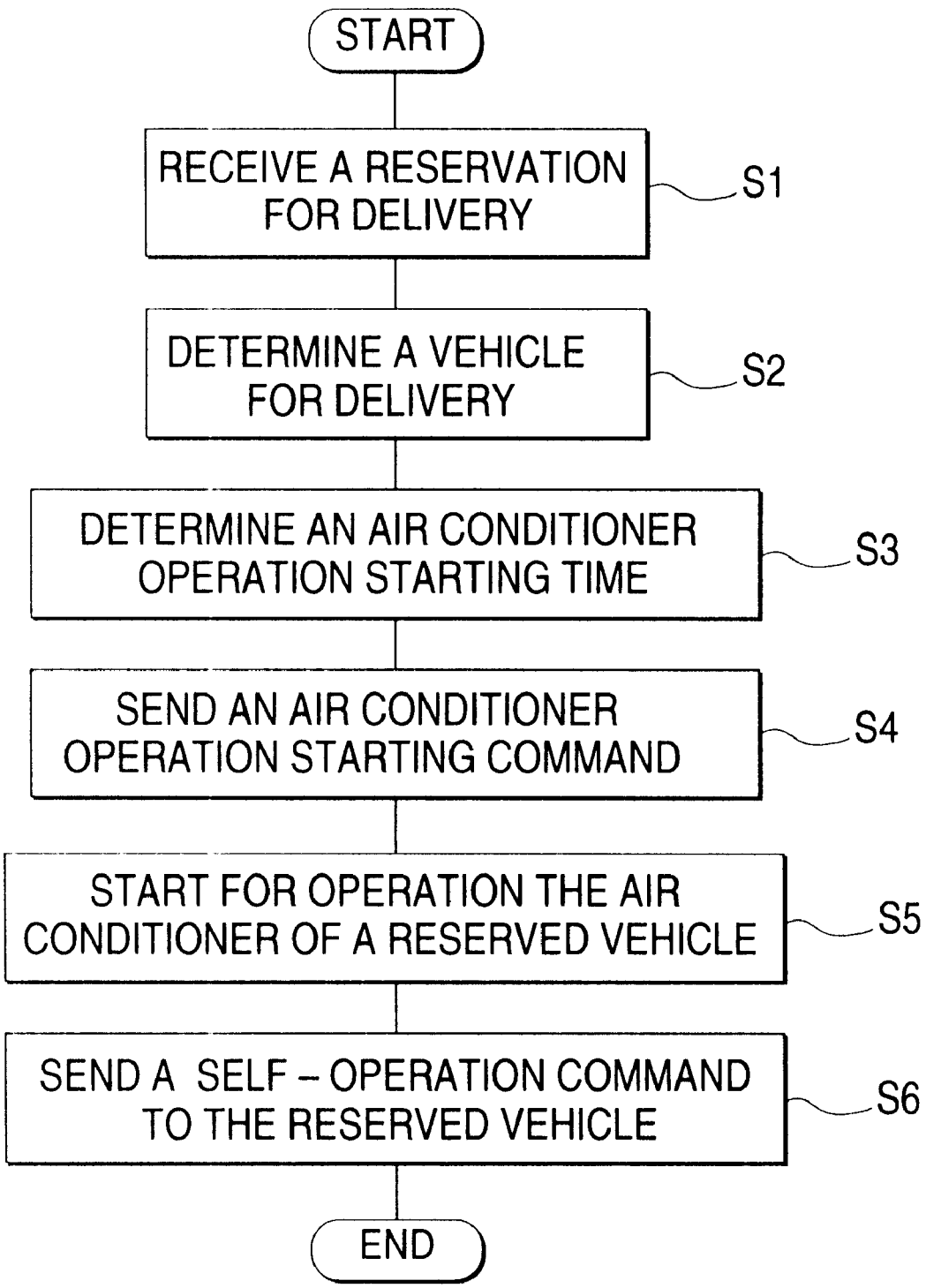
FIG. 3 is a control flowchart according to the embodiment.

Next, an operation of the embodiment will be described while following a flowchart in FIG. 3 which describes a case where there is inputted a reservation for a vehicle for delivery for rent from a user R.

In Step S1, a reservation for a vehicle for delivery for rent is received at the vehicle supervision 1 from the reservation terminal 9, after which in Step S2, a vehicle 4 to be rented out is determined by the vehicle supervision 1. Indetermination of the vehicle 4, a program is incorporated in which the vehicle 4 is waiting at a predetermined port 10 in response to, for example, a specified delivery time for rent, place and number of vehicles for delivery for rent, in such a manner as to be in time for the specified delivery time for rent.

In addition, it is desirable that the residual capacity of the battery of the vehicle 4 kept waiting until the specified delivery time for rent is substantially full or 100% charged, and therefore, the vehicles are not rented out which have batteries whose residual capacity is measured to be less than 60% for some reason at the time, for example, an hour or so prior to the specified delivery time for rent. On the other hand, only the vehicles 4 are regarded as suitable for delivery for rent which have the battery residual capacity of greater than 60% of its full capacity. Since the required residual capacity for a battery is determined based on the capacity thereof, the present invention is not always limited to 60% of the full capacity of a battery.

Next, in Step S3, an operation starting time $T_1$ of the air conditioner 5 of the reserved vehicle 4 is determined. In determination of this operation starting time $T_1$, there are two embodiments disclosed for determining it as proposed shown in FIG. 4.

In a first embodiment for determining the operation starting time $T_1$, assume that the delivery time for rent is 13:00 hours, the operation starting time $T_1$ of the air conditioner 5 is set an hour prior to it, that is, 12:00 hours.

Figure 5:
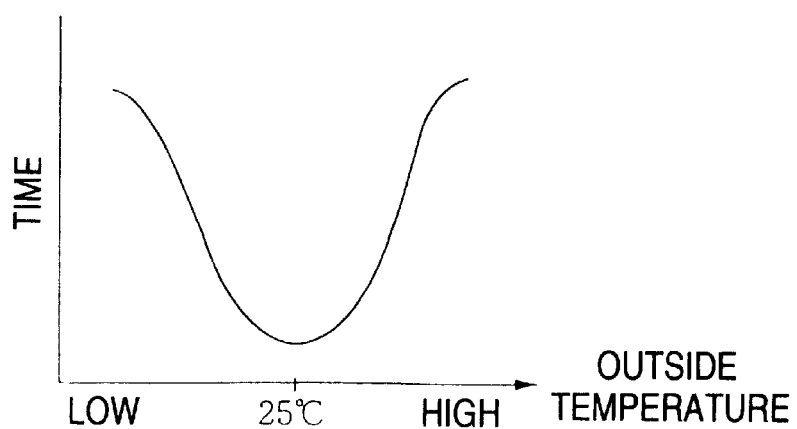
FIG. 5 is a graph according to the embodiment.

In starting the air conditioner 5 for operation, an operation continuing time Tk is retrieved in response to the outside temperature at the port 10 at the operation starting time $T_1$ by the vehicle controlling device 7 based on a map shown in FIG. 5. Here, in a case where a target value is set at, for example, 25° C., the operation continuing time Tk for the air conditioner 5 becomes longer as the outside temperature then deviates higher from this target value.

Here, in determination of the operation continuing time for the air conditioner 5 according to the first embodiment of the invention as shown, the continuing time has to be determined such that an optimum in-compartment environment can be secured when the operation continuing time Tk has elapsed, the air conditioner 5 has been turned off and the specified delivery time for rent $T_2$ being reached after a period of time during which the air conditioner is not operating. When this is attained, the optimum in-compartment environment can be secured at the delivery time $T_2$ for rent. In addition, setting of the operation starting time $T_1$ a given number of hours before the delivery time $T_2$ for rent depends on the capacity of the air conditioner 5 equipped on the vehicle, and therefore, the present invention is not always limited to an hour before the delivery time for rent.

Figure 4:
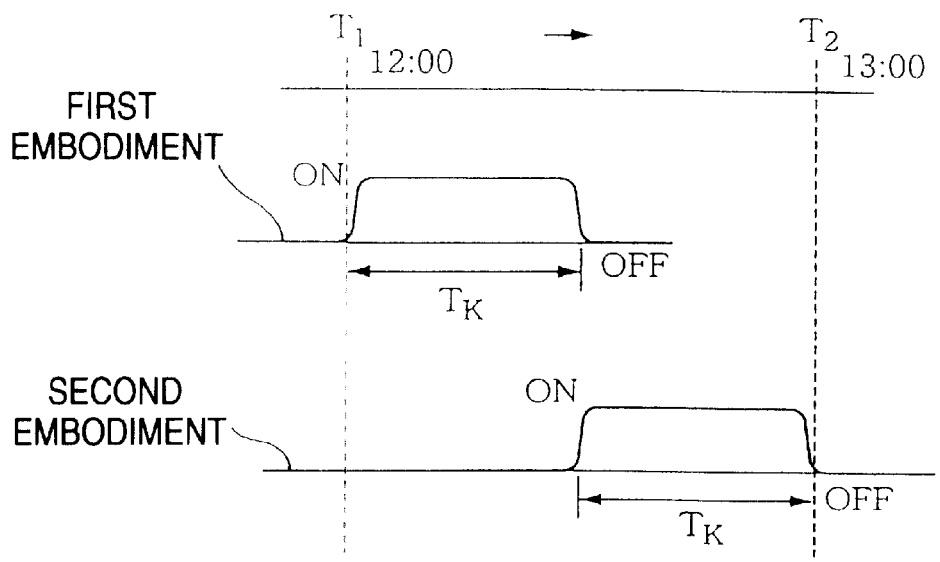
FIG. 4 is a control time chart according to the embodiment, and according to a second embodiment.

In a second embodiment of the invention shown in the lower portion of FIG. 4, determination of the operation continuing time Tk, i.e., for how many minutes before and ending up at the delivery time $T_2$ for rent the air conditioner 5 should be operated to secure an optimum in-compartment environment at the deliver time $T_2$ for rent, is calculated based on the outside temperature measured an hour before the deliver time $T_2$ for rent. Then, from this operation continuing time Tk so calculated, the operation starting time $T_1$ for the air conditioner 5 is determined. According to such construction, the second embodiment is advantageous in that no time is lost from when the air conditioner 5 is stopped until the delivery time $T_2$ for rent, unlike the case with the first embodiment.

Here, in selection of vehicles 4 applicable for starting the air conditioners 5 thereof for operation as described above, it is basically desirable to select vehicles 4 having batteries of high residual capacity. However, if there is no time for re-charging, in a case where the residual capacity of the batteries of some of the vehicles 4 allocated for selection is, for example, less than 80% of the full capacity, the air conditioners 5 of those vehicles 4 are not started, and only those vehicles 4 having the battery residual capacity of 80% or greater are selected for operation of the air conditioners 5. Since the required battery residual capacity is determined in accordance with the capacity of the battery, the invention is not always limited to 80%.

In a case where there are waiting a plurality of vehicles 4 having the battery residual capacity of 80% or greater, when this is an operation criterion of the air conditioner 5, the vehicle 4 having the greatest residual capacity is allocated for selection. Through such selection even if there is expected some reduction in the residual capacity due to the operation of the air conditioner 5, the reduction in travelling distance is thus tried to be minimized or prevented. In addition, in a case where the vehicles 4 selected as applicable for delivery for rent based on the required battery residual capacity of 80% or greater have substantially the same residual capacity, the vehicle 4 waiting beside the battery charger 11 is selected for distribution. In this situation, the air conditioner 5 of the selected vehicle 4 is tried to be activated by the battery charger 11, thereby preventing the consumption of power of the battery fitted on the vehicle.

In addition, the selection of the vehicles 4 for distribution and activation of the air conditioners 5 are judged based on the residual capacity of their batteries at a predetermined time (for instance, an hour) prior to a specified delivery time for rent, which is the operation time for the air conditioners 5. In a case where the vehicle 4 is allocated for delivery for rent fully prior to the specified delivery time for rent, the vehicle 4 to be rented out is moved beside the battery charger 11 for re-charging, and if the charger 11 still holds extra power, it is possible to activate the air conditioner 5 thereof with the power of the charger 11.

Then, when the operation starting time $T_1$ for the air conditioner 5 has come, in Step S4, a command for starting the operation of the air conditioner 5 is sent from the supervision controlling device 3 to the self-operation controlling radio device 6 of the vehicle 4 selected for delivery for rent via the supervision radio device 2, and in Step 5, the air conditioner 5 is activated via the vehicle controlling device 7.

Following the above operation, in Step 6, a command for self-operation of the vehicle 4 is sent from the supervision controlling device 3 to the self-operation controlling radio device 6 of the vehicle 4 selected for delivery for rent via the supervision radio device 2, whereby the vehicle 4 so reserved is delivered to a place where the user who reserved it is waiting. At this point of time, the in-compartment environment has reached to its optimum condition.

Consequently, according to the aforesaid embodiment, since the air conditioned state can be provided inside the compartment of the vehicle 4 delivered to the user who has made a reservation at the specified delivery time for rent $T_2$, an optimum in-compartment environment can be secured in synchronism with the delivery of the vehicle 4 for rent. In addition, since the air conditioners 5 of only those vehicles 4 whose battery residual capacity is equal to or greater than the predetermined amount are selected so as to be started for operation according to the invention, it is possible to eliminate a risk of a dead battery that would take place when the air conditioner 5 of the vehicle 4 is started for operation whose battery residual capacity is low.

Then, since the in-compartment environment of the vehicle can be set as required at the specified delivery time for rent $T_2$ by starting the air conditioner 5 for operation the predetermined length of time prior to the specified delivery time for rent, it is possible to secure an optimum in-compartment environment.

Furthermore, since the controlling system of the invention can deal with a plurality of vehicles 4 reserved at the same time, and since the air conditioners 5 of the reserved vehicles 4 only can be started for operation in a collective fashion, there is produced less waste compared with the case where the air conditioners 5 are operated at all times, and a comfortable passenger compartment can be provided only in those vehicles 4 then required for use.

While only certain embodiments of the invention have been specifically described herein, it will apparent that numerous modifications may be made thereto without departing from the spirit and scope of the invention as set forth in the appended claims.

What is claimed is:

1. An air conditioning control system for vehicles for common use, comprising:
reservation means for reserving rental of said vehicles with corresponding delivery times of said vehicles; and
activating means for automatically activating all air conditioner of each said vehicle so reserved when said corresponding delivery time approaches based on reservations made by said reservation means.

2. An air conditioning control system as set forth in claim 1, wherein said vehicles for common use are electric vehicles, and
wherein said activating means activates said air conditioners of only those of said electric vehicles that are waiting for delivery and which are equipped with batteries having a residual capacity equal to or greater than a predetermined amount.

3. An air conditioning control system as set forth in claim 1, wherein said activating means starts the activation of said air conditioner of each said vehicle so reserved at a predetermined time prior to said corresponding delivery time therefor.

4. An air conditioning control system for vehicles for common use, comprising:
reservation means for reserving rental of said vehicles with corresponding delivery times of said vehicles; and
activating means for activating an air conditioner of each said vehicle so reserved when said corresponding delivery time approaches;
wherein said activating means comprises:
a supervision radio device provided on a supervision side, for transmitting a command for self-operation to each said reserved vehicle; and
self-operation controlling radio devices provided on said vehicles, respectively, for receiving said command from said supervision radio device.

5. An air conditioning control system for vehicles for common use, comprising:
reservation means for reserving rental of said vehicles with corresponding delivery times of said vehicles; and
activating means for activating an air conditioner of each said vehicle so reserved when said corresponding delivery time approaches;
wherein said vehicles for common use are electric vehicles; and
wherein said air conditioner of each said reserved electric vehicle is activated by a battery charger.

6. An air conditioning control system for vehicles for common use, comprising:
a vehicle supervision which receives reservations of said vehicles with corresponding delivery times and which selects those of said vehicles to be rented out for said reservations, respectively;
air conditioners respectively mounted on said vehicles for common use; and
vehicle controlling devices respectively mounted on said vehicles for common use, for controlling said air conditioners; and
wherein said vehicle supervision sends a command for activating said air conditioner to said vehicle controlling device of each of said vehicles for common use which has been selected.

7. An air conditioning control system as set forth in claim 6, wherein said vehicles for common use are electric vehicles, and
wherein selected by said vehicle supervision is such that said air conditioners of only said electric vehicles that are waiting for delivery and which are equipped with batteries having a residual capacity equal to or greater than a predetermined amount are activated.

8. An air conditioning control system as set forth in claim 6, wherein activation of said air conditioner of each of said vehicles for common use which has been selected to be rented out is started at a predetermined time prior to said corresponding delivery time therefor.

9. An air conditioning control system as set forth in claim 6, further comprising:

a supervision radio device provided in said vehicle supervision, for transmitting a command for self-operation to each of said vehicles for common use which has been selected to be rented out; and self-operation controlling radio devices respectively connected to said vehicle controlling devices on said vehicles for common use, for receiving said command from said supervision radio device.

10. An air conditioning control system as set forth in claim 6, wherein said vehicles for common use are electric vehicles, and wherein said air conditioner of each of said electric vehicles which has been selected to be rented out is activated by a battery charger.

11. An air conditioning control system as set forth in claim 3, wherein said activating means discontinues operation of the air conditioner of each said vehicle so reserved at another predetermined time prior to said corresponding delivery time therefor.

12. An air conditioning control system as set forth in claim 3, wherein said activating means activates operation of the air conditioner of each said vehicle so reserved up to said corresponding delivery time therefor.

13. An air conditioning control system as set forth in claim 1, wherein said activating means receives a reservation from said reservation means, and determines a vehicle for delivery and a operation starting time for an air conditioner of said vehicle based on said reservation.

* * * * *

UNITED STATES PATENT AND TRADEMARK OFFICE
CERTIFICATE OF CORRECTION

PATENT NO. : 6,357,244 B1
DATED : March 19, 2002
INVENTOR(S) : Naoki Mori

It is certified that error appears in the above-identified patent and that said Letters Patent is hereby corrected as shown below:

Title page,
Item [57], ABSTRACT,
Line 2, change "a rentals" to -- rentals --.
Item [57], ABSTRACT,
Line 8, after "out" insert -- to --.

Column 2,
Line 9, change "thereof specifically," to -- thereof. Specifically, --.
Line 10, after "electric" insert -- vehicles --.
Line 43, after "vehicles" insert a comma.
Line 62, change "graph" to -- map for extracting an operation continuing time Tk --.

Column 3,
Between lines 38 and 39, change "Indetermi-" to -- In determi- --.
Line 62, change "embodiments disclosed" to -- disclosed embodiments --; delete "proposed".

Column5,
Between lines 56 and 57, change "it will apparent" to -- it will be apparent --.
Between lines 65 and 66 (5th line of claim 1), change "all" to -- an --.

Column 6,
Line 65, change "selected" to -- selection --.

Column 8,
Change "a operation" to -- an operation --.

Signed and Sealed this

Fourth Day of June, 2002

*Attest:*

*Attesting Officer*

JAMES E. ROGAN
*Director of the United States Patent and Trademark Office*